United States Patent [19]

Greskovich

[11] Patent Number: 4,515,095
[45] Date of Patent: May 7, 1985

[54] COMBUSTION OF COAL/WATER SLURRIES

[75] Inventor: Eugene J. Greskovich, Allentown, Pa.

[73] Assignee: Air Products and Chemicals, Inc., Allentown, Pa.

[21] Appl. No.: 605,945

[22] Filed: May 1, 1984

Related U.S. Application Data

[63] Continuation-in-part of Ser. No. 585,796, Mar. 2, 1984, abandoned.

[51] Int. Cl.$^3$ .............................................. F23D 1/00
[52] U.S. Cl. .................................... 110/347; 110/263
[58] Field of Search ................. 110/347, 263, 264, 265

[56] References Cited

U.S. PATENT DOCUMENTS

| | | |
|---|---|---|
| 3,124,086 | 3/1964 | Sage et al. ...................... 110/347 X |
| 3,941,552 | 3/1976 | Cottell . |
| 4,211,174 | 7/1980 | Martin et al. . |
| 4,326,856 | 4/1982 | Muenger et al. . |
| 4,394,137 | 7/1983 | Marion et al. . |

OTHER PUBLICATIONS

R. J. West, et al., AFRC-IFRF Symposium on Conversion to Solid Fuels, paper 82-9; 1-51 (1982).
J. A. Barsin, 9th Energy Technology Conference and Expo., Washington, DC, Feb. 1982.
E. T. McHale, et al., Combustion and Flame, 45, 121 (1982).
G. Farthing, Jr., et al., EPRI Report CS-2286 (1982).
J. Barsin, Proceedings of Coal: Phoenix of the '80s., Halifax, Nova Scotia (1981).
Y. S. Pan, et al., Proceedings of the 4th International Symposium on Coal/Slurry Combustion, vol. II, Session III (1982).
R. K. Manfred, et al., ACS Division of Fuel Chemistry Reprints, 28.2, 36 (1983).

Primary Examiner—Edward G. Favors
Attorney, Agent, or Firm—Geoffrey L. Chase; E. Eugene Innis; James C. Simmons

[57] ABSTRACT

A method is disclosed for improving ignition time delay and carbon conversion efficiency in the combustion of coal water slurries wherein oxygen-enrichment of primary air is performed in the range of greater than 21% and up to 28%.

9 Claims, 3 Drawing Figures

COMBUSTION OF COAL/WATER SLURRIES

CROSS REFERENCED TO RELATED APPLICATIONS

This application is a continuation-in-part of U.S. application Ser. No. 585,796 filed Mar. 2, 1984 now abandoned.

TECHNICAL FIELD

The invention relates to a process for the combustion of coal/water slurries in a furnace firebox. More particularly, the invention relates to combusting a coal/water slurry which is fed into the furnace firebox with an oxygen-enriched primary airstream while also supplied with a secondary airstream.

The invention provides a method for increasing the steaming rate of a boiler combusting coal/water slurries while improving the overall stability of the boiler operation.

BACKGROUND OF THE PRIOR ART

A suspension of fine coal particles in an aqueous medium, hereafter called coal/water slurry, is a relatively new fuel proposed for various combustion purposes. In particular, this fuel has been used in the past in boiler applications (as presented by Marnell and Krishna, 9th Energy Technology Conference and Expo., Washington, DC, Feb. 16-18, 1982) to generate heat that can be used directly or indirectly for the purpose of providing steam energy demands. This steam is subsequently used in industrial boilers to provide heat or in utility boilers to generate eletricity. In these studies, Marnell and Krishna concluded that this fuel was successfully burned and represented a viable alternative to burning other fuels, especially liquid fuels, in boilers.

The use of coal/water slurries in newly built combustion facilities is now being considered much more strongly than in the past due to the reduced availability of petroleum fuels and natural gas. Moreover, the use of these slurries is being very actively considered as a replacement for petroleum based liquid fuels in boilers. One of the key problems to be solved is how to make a coal/water slurry flame behave like a flame generated by a liquid fuel. Although this problem can be handled through design in newly built boilers, it presents a major obstacle in using slurries in existing boilers designed for petroleum liquids; that is, boilers retrofitted for coal/water slurries.

One particular variable, and perhaps the most important that affects boiler operations is ignition time. Recent studies by West, R. J., et al., AFRC-IFRF Symposium on Conversion to Solid Fuels, Paper 82-9: 1–51 (1982) indicate ignition of pulverized coal is difficult during start up of boilers. Coal/water slurries would make the ignition process even more difficult during start-up. Furthermore, due to the longer ignition times for coal/water slurries, the flame can become unstable during combustion at steady state and low load levels and "lock out". Once the flame goes out, an expensive time-consuming process of restarting the boiler must be carried out. Reports of stability problems with coal/water slurries, especially for low volatility coals, are noted in literature, such as J. A. Barsin, 9th Energy Technology Conference and Expo., Washington, DC, February 1982.

The earlier and the predominant number of coal/water slurry combustion tests required either or all of the following criteria: a preheated (to 1650° F.) furnace as described by E. T. McHale, et al., Combustion and Flame, 45, 121 (1982) and G. Farthing, Jr., et al. EPRI Report CS-2286 (1982); a continuous pilot flame of natural gas (providing ca. 10–15% of the thermal input) as described by J. Barsin, Proceedings of Coal: Phoenix of the '80s, Halifax, Nova Scotia (1981) and Y. S. Pan, et al., Proceedings of the 4th International Symposium on Coal/Slurry Combustion, Vol. II, Session III (1982); or excessive, by industrial standards, combustion air preheat (400°–500° F.) as noted by the various authors just mentioned. As the state-of-the-art increased, the need for these three kinds of thermal support has reduced, but air preheating continues to remain a necessity, although at a level somewhere around 250° F. as noted by R. K. Manfred, et al., ACS Division of Fuel Chemistry Reprints, 28.2, 36 (1983). This has been the case even though rather readily ignitable, high-volatile bituminous coals were loaded into the coal/water slurry.

Once ignited, coal-water slurries can only be burned over a relatively narrow range of operating conditions. For the most part, coal-water slurries can only be burned with excess air to achieve relatively high carbon conversion efficiencies (90+%). Sub-stoichiometric, or fuel rich, efficient combustion has not been successfully accomplished. This fact would deny to coal/water slurry burning the advantages of staged combustion for $NO_x$ control.

Because of the relatively poor ignition and stability characteristics of coal/water slurry flames, burner turndown ratios (rate of firing) have been rather low in the range of between 1:1 to 2:1. For slurries to replace petroleum liquids, the optimum turndown ratio would have to be approximately 4:1. Ignition and stability can be good and the turndown ratio still be poor as noted by G. Farthing, Jr. in the reference just cited above. Recently, some progress has been made toward improving burner turndown ratios as noted by R. K. Manfred, et al. (cited above), but still apparently only at high levels of excess air.

Another major variable that affects boiler efficiency during the use of coal/water slurries is carbon conversion efficiency. Carbon conversion is a measure of the degree to which the combustion of a coal particle is complete. When the carbon conversion efficiency is 100%, no carbon ends up with the ash as a by-product. The efficiencies of carbon conversion in pulverized coal-fired boilers are generally in the range of 95+% and are boiler and coal specific. Older or poorly-operated boilers and low volatile, high-ash coals have lower carbon conversion efficiencies, and the differences between these percentages and 100% represents costly and wasted fuel. Carbon conversion efficiencies for coal/water slurries are typically lower than for pulverized coal and range from approximately 92% to 95%.

Other problems experienced in boiler operations when using non-conventional particulate fuels such as wood, refuse, wastewater sludges, etc. either in a relatively dry form or in slurries containing water and/or oil and combinations thereof can also be alleviated using oxygen enriched air. That is, the benefits described herein for coal/water slurries in ignition time and carbon conversion improvements can also be gained when using these alternate non-conventional solid fuels, or slurries made therefrom.

Very little direct patent literature is available regarding coal/water slurry combustion with or without oxygen enrichment. However, several related patent references are noted. U.S. Pat. Nos. 4,394,137 and 4,326,856 discuss the generation and purification of synthesis gas produced by the partial oxidation of coal. In these cases, a coal/water mixture is fed to a reaction zone along with air enriched with oxygen to produce a high BTU synthesis gas composed primarily of CO and $H_2$. The conditions required to maximize conversion to synthesis gas is very high pressure and lower temperatures when compared to combustion. In addition, oxygen enrichment is used primarily to reduce the nitrogen content of the product gas to maximize its BTU value, not to effect reaction kinetics per se. The reaction mechanisms, conditions, and rationale for using oxygen are totally different in these POX operations compared to coal combustion for boiler operations.

U.S. Pat. No. 4,211,174 indicates that coal can be oxidized in a slurry medium such as water to recover heat and sulfur-containing ash by-product. It was disclosed that oxygen enriched air can be employed to better achieve the desired oxidation results. In this process, the temperatures are very low compared to combustion ($\sim 400°-700°$ F. versus $3000°-4000°$ F.) and the reaction of oxygen in the coal takes place in a gas/liquid reactor system, at high residence times, with a catalyst to generate an approximate equilibrium composition of oxidizable and oxidized components. The conditions of temperature, pressure, and excessively long residence times makes this process very different from direct coal combustion.

U.S. Pat. No. 3,941,552 describes a process in which a coal/water/oil mixture is burned in a furnace. This reference is cited to indicate that many variations of pulverized solids and/or slurry media are being considered for commercial combustion applications, which could benefit from oxygen enrichment.

SUMMARY OF THE INVENTION

The present invention relates to a method for combusting coal/water slurries with oxygen enriched air in a furnace firebox which contains means for supplying the coal/water slurry, a primary airstream and a secondary airstream into the firebox. The method for combustion comprises;

(a) feeding a coal/water slurry into the furnace firebox along with primary and secondary airstreams to yield a flame of combustion to substantially completely combust the coal to $CO_2$ and $H_2O$, and (b) adding a sufficient amount of oxygen into the primary airstream, such that the oxygen concentration of the air in the flame zone when the primary and secondary airstreams converge with the coal is greater than 21 and less than or equal to 28 volume percent.

DETAILED DESCRIPTION OF THE INVENTION

Figure 1:
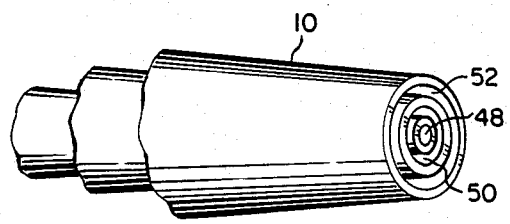
FIG. 1 is a schematic illustration of a typical burner nozzle used to inject fuel and oxidant into a furnace.
Figure 2:
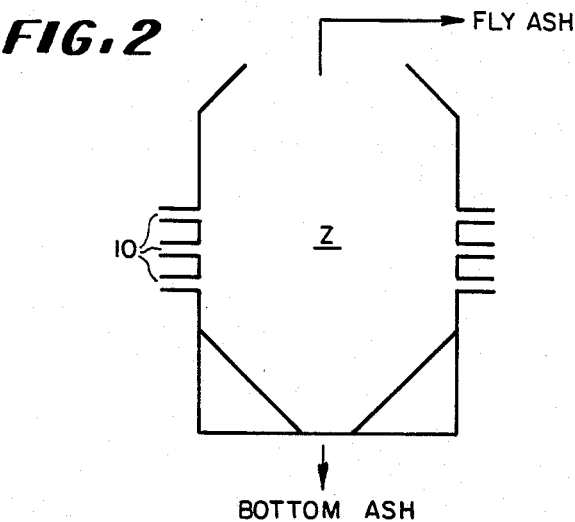
FIG. 2 is a drawing of a conventional boiler having a firebox section where fuel is combusted.

A slurry of finely pulverized coal in the size range of 50-70 microns is prepared by combination with water and selected chemical additives. This coal/water slurry is typically 50 to 75 wt% coal. The additives are comixed to provide slurry stability. This fuel is atomized through one or more injection nozzles, 10 as depicted in FIG. 1, into the furnace firebox combustion zone Z as depicted in FIG. 2. Coal/waer slurry is conveyed through the nozzle in duct 48 at a prescribed rate along with sufficient air in primary annular passage 50 and secondary annular passage 52 to sustain combustion. Normally, additional air over and above this amount is necessary to maintain optimal combustion conditions and is generally called "excess air".

As noted in FIG. 1, the air that is supplied in passage 50 is called primary air and air in passage 52 is called secondary air. In the experiments described herein, both primary and secondary airstreams were used in order to simulate the conventional concentric, pulverized coal burner nozzle used in industrial and most utility applications. Therefore, the primary airstream does not convey the coal/water slurry as it does for pulverized coal, but it is the first airstream to intimately contact the atomized coal/water slurry. Hence, we will refer to this stream as the primary airstream and likewise refer to air in passage 52 as the secondary airstream. It is possible to adequately combust coal water slurries with only one airstream in the annulus and/or to add additional air to zone Z by other means for a variety of control purposes; however for the purposes of this invention the advantage in the use of two airstreams in ducts 50 and 52 will become obvious.

Figure 3:
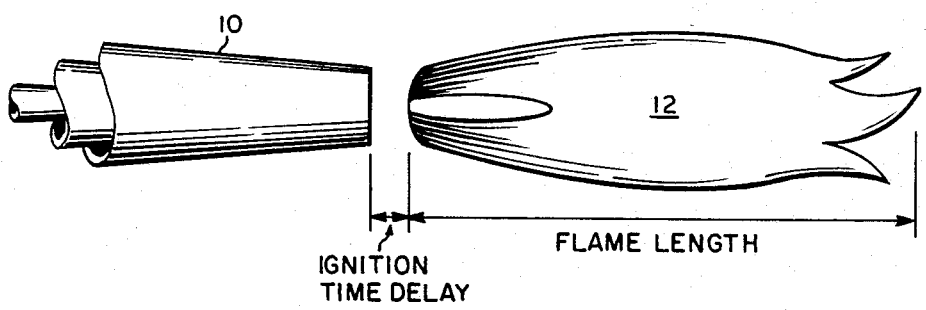
FIG. 3 illustrates a typical flame created by the flow of fuel and oxidant from the nozzle after ignition.

As shown in FIG. 2, fuel and air are combusted in combustion zone Z where a stable flame must exist for efficient heat transfer purposes. Typically, a single flame can be depicted as in FIG. 3 where the fuel and air (both primary and secondary) issue from the nozzle 10. The flame 12 is characterized by the nature of the fuel, including volatility and surface area, the oxidant characteristics, namely the partial pressure of oxygen, and the temperature and the oxygen to fuel ratio. The fuel/air mixture can ignite at some distance, known as the standoff distance, from the nozzle tip as depicted in FIG. 3. When this length is divided by the flow velocity, the result is called ignition time. Various fuels when combusted in the manner described herein yield varying ignition times, or ignition-time delay, of approximately 0 to 20 milliseconds. The smaller the delay, the more stable the flame. As the ignition time increases, the flame becomes so unstable that it could go out. Typically, natural gas and high quality liquid petroleum fuels yield little or no ignition time delays. Pulverized coal, particularly bituminous coals, have ignition time delays higher than gaseous or liquid fuels, and these delays are very much a function of primarily the coal particle size, volatile matter content and burner swirl. For coal/water slurries with approximately 30% by weight water, ignition times are much larger than those for the pulverized parent coal. In many cases for high volatile matter bituminous coals, the pulverized parent coal has little or no ignition time delay, whereas the coal/water slurry yields ignition time delays of 4 to 8 milliseconds. In order to overcome this problem, it has been proposed to either increase the temperature of the air and/or coal/water slurry prior to leaving nozzle 10 or increase the solid or liquid volatility, such that upon ignition in combustion zone Z the ignition time is reduced.

The efficiency at which a coal/water slurry is burned, based on the amount of carbon fed to zone Z in the boiler, is measured by the amount of carbon remaining in the ash. As the amount of residual carbon in a given amount of ash decreases, the carbon conversion efficiency increases. For gaseous and liquid petroleum fuels, the carbon conversion efficiencies are very high, approaching 100%. For pulverized bituminous coals, this may be reduced to approximately 95%, depending on coal quality. It would be expected that coal/water slurries would yield values somewhat similar to the pulverized parent coal.

According to the present invention, the coal/water slurry is injected into the firebox combustion zone Z and contains approximately 60-75% by weight coal with a particle size of approximately 45-70 microns. The rate at which air is passed through the annular cylinders 50 and 52 of nozzle 10 is adjusted to be in excess of that theoretically required for complete combustion. As a typical example, if one gallon per hour of slurry was fed into the firebox combustion zone Z, the total air flow rate would be about 965 ft³/hr, proportioned as 145 ft³/hr in the primary airstream through annular space 50 and as 820 ft³/hr in the secondary airstream through annular space 52. This results in approximately 20% excess air. These values are obviously dependent on the type of coal and coal/water slurry assumed.

An addition of above 0 to about 7 vol% oxygen enrichment, preferably of commercially pure oxygen, is made to the air so that the total air injected into the firebox combustion zone has an oxygen partial pressure of above 0.21 to about 0.28 atmospheres, i.e., greater than 0.21 to about 0.28 atmospheres. The oxygen enrichment addition may be made entirely in the primary air, or in both the primary and secondary air provided that at least 0.15 vol% oxygen enrichment of the total air is achieved through enrichment of the primary air. Oxygen enrichment above 7 vol% offers little if any additional benefit because of undesirably high temperatures within the furnace and their effect on ash slagging and furnace internals.

Such oxygen enrichment markedly changed the characteristics of the coal/water slurry flame when burning bituminous coals. Under these conditions, it was found that the flame was unexpectedly more stable due to the marked reduction in ignition time. This resulted in higher carbon conversion efficiencies and overall rendered the coal/water slurry mixture an excellent fuel source. These findings will be described in more detail by the following examples.

EXAMPLE 1

A number of dry pulverized bituminous coals listed in Table I were combusted in a multipurpose horizontal burner capable of firing solid, liquid, gaseous and slurry-type fuels. The pulverized coals were conveyed with the primary airstream in duct 50 as noted in FIG. 1. Duct 48 was not used during these experiments.

TABLE I

| | PROPERTIES OF THE DRY PULVERIZED COALS BURNED | | | | |
|---|---|---|---|---|---|
| | Proximate Analysis | | | | |
| Parent Coal # | Volatile Matter | Ash | Fixed Carbon | Moisture | Heating Value (Btu/lb) |
| | (dry, wt %) | | | | |
| 1 | 39.6 | 5.0 | 53.8 | 3.0 | 13,770 |
| 2 | 36.0 | 13.2 | 48.5 | 2.3 | 12,500 |
| 3 | 35.0 | 6.2 | 58.8 | 2.0 | 14,110 |
| 4 | 29.2 | 3.9 | 66.9 | 2.8 | 15,125 |
| 5 | 24.2 | 14.7 | 61.1 | 5.0 | 12,920 |

TABLE I-continued

| | PROPERTIES OF THE DRY PULVERIZED COALS BURNED | | | | |
|---|---|---|---|---|---|
| | Proximate Analysis | | | | |
| Parent Coal # | Volatile Matter | Ash | Fixed Carbon | Moisture | Heating Value (Btu/lb) |
| | (dry, wt %) | | | | |
| 6 | 17.4 | 17.8 | 64.8 | 6.0 | 12,590 |
| 7 | 6.5 | 8.6 | 84.9 | 0.8 | 13,480 |
| 8 | 29.9 | 18.1 | 51.9 | 0.8 | — |

These tests were necessary to provide a base for the subsequent slurry studies and to provide experimental guidance. Parent coals 1, 2, and 3 containing the highest volatile matter contents burned in air at a rate of approximately 4 lbs/hr with 20% excess air with no detectable ignition time delays. Parent coals 4 and 5 had ignition times of 3 and 7 milliseconds, respectively when combusted in the same manner. However, when only 2 vol% oxygen enrichment was added to the primary air (which was 15% of the total combustion air), the ignition times were reduced to zero. Only coals 6 and 7 continued to yield ignition time delays.

When additional oxygen enrichment was employed with coal 6, it was unexpectedly found that the location of the oxygen addition had a marked influence on the result. For example, when the oxygen enrichment was further increased to 4 vol% in the primary air (yielding a total combustion air of 21.6 vol% oxygen), the ignition time for coal 6 was reduced to zero. However, when the oxygen enrichment was added to the secondary airstream, the result was unexpectedly poorer. Even at an oxygen enrichment level of 1.1 vol% in the secondary air (yielding a total combustion air of 22.0 vol% oxygen), the ignition time was reduced from only 12.1 to 10.6 milliseconds compared to the reduction to zero for addition to the primary airstream. On this basis, all further oxygen enrichment tests for ignition time delays were conducted with oxygen addition in the primary airstream to achieve maximum benefits.

Another interesting result of pulverized coal combustion and unexpected results for primary air enrichment was the effect of oxygen enrichment on slagging. Slagging was measured by inserting a water cooled probe before the exhaust section of the combustor. It was found that slagging, as measured by ash buildup on the probe, increased when oxygen enrichment was added to the secondary air or added in premixed fashion to both the primary and secondary air. However, when oxygen enrichment was added to only the primary air, there was a marked reduction in slag deposition. For example, when an unusually high ash coal like parent coal #8 was combusted, slag deposition on the probe decreased by approximately 45% as oxygen enrichment was increased to 4 vol.%. This unexpected result further supports the preferred use of enrichment in the primary air only.

The multipurpose horizontal burner described in Example 1 was used to combust coal/water slurries. It was initially apparent that it was difficult to ignite and subsequently stabilize a coal/water slurry flame. However, once a flame was ignited in air, even though very unstable, the introduction of oxygen enrichment markedly affected the flame aerodynamics and, in certain cases, led to flame lick out. In particular, it was found that despite oxygen addition in the secondary air, the flame would either lock out or not ignite. Whereas, when oxygen addition was made in the primary air, the flame would not only ignite, but ignite with smaller delays and produce overall a more stable flame. It was concluded that oxygen enrichment into the primary air uniquely improved ignition time delays and flame stability for coal/water slurries compared to combustion in air alone or compared to oxygen addition in the secondary air.

EXAMPLE 2

Various coal/water slurries whose properties are listed in Table II were combusted in the burner described in Example 1.

TABLE II
PROPERTIES OF COAL/WATER SLURRIES

| Fuel Property | Coal/Water Slurry | | | |
| --- | --- | --- | --- | --- |
|  | A | B | C | D |
| Coal (wt %, CWS) | 69.3 | 75.4 | 69.4 | 69.9 |
| Volatile Matter (wt %, Parent) | 32.4 | 17.1 | 35.7 | 32.7 |
| Volatile Matter (wt %, CWS) | 24.7 | 13.1 | 24.8 | 22.9 |
| Ash (wt %, CWS) | 4.9 | 13.4 | 5.9 | 6.9 |
| Sulfur (wt %, CWS) | 0.66 | 1.93 | 0.81 | 0.77 |
| Nitrogen (wt %, CWS) | 1.22 | 0.83 | 1.12 | 1.41 |
| Heating Value (Btu/lb) | 11,041 | 9,470 | 10,180 | 10,180 |
| Mass Mean Diameter (microns) | 44. | 48 | 67 | 48 |

Four different coal/water slurries prepared by various commercial vendors were used in the test program. The coal/water slurry fuels were fired at 0.10 gallons per hour (ca. 10,000 BTU/hr) and were atomized to a mean droplet size of approximately 100 microns. The slurry was pumped through a central passage noted as duct 48 in FIG. 1 and just at the point of injection into the furnace, it was atomized ultrasonically. In firing these fuels, the primary air represented 15% of the total combustion air with 20% overall excess air. In these combustion tests, the oxygen enrichment was added to the primary air. The results are tabulated in Table III.

TABLE III
IGNITION TIMES FOR COAL/WATER SLURRIES

| Coal Fuel | Primary Air (15%) Enrichment (Volume % Oxygen) | | | |
| --- | --- | --- | --- | --- |
|  | 21% | 22% | 23% | 25% |
| Slurry A | 3.6 | 0 | 0 | 0 |
| Slurry B | ∞ | ∞ | 10.5 | 4.5 |
| Slurry C | 8 | 4 | 0 | 0 |
| Slurry D | 4.1 | 0 | 0 | 0 |

Note:
Ignition time given in milliseconds

It can be noted that when no oxygen enrichment was added, that is, the primary air contained 21 vol% oxygen, very large to infinite ignition time delays were measured. The flames that did ignite were quite unstable and difficult to maintain. When oxygen was added in the primary air to 22 vol% there was a reduction in ignition time delay, but unexpectedly larger than that from combustion tests using pulverized coal or from prior art. For slurries A and D the ignition times were reduced to zero indicating no ignition time delay. When oxygen enrichment was further increased yielding primary air at 23 vol%, the ignition time of slurry C was also reduced to zero. Slurry B still had a considerable delay; however, all flames but B exhibited excellent stability.

Interpretation of these results indicate that ignition times are markedly affected by volatile matter of the parent coal. That is, the higher the volatile matter, everything else being somewhat constant, the lower the ignition times. In the case of slurry B, the volatile matter was so low that even after oxygen enrichment of the primary air to 25 vol%, significant ignition time delays were experienced; however, it can be noted that oxygen enrichment was significantly beneficial in reducing ignition delays for both the low and high volatile coals.

Various dry pulverized coals were combusted in a separate set of experiments using oxygen enriched air to baseline the apparatus, as noted in Example 1. When ignition times of these coals were compared to the slurries, it was found that ignition times for the slurries were always much higher at the same equivalent parent coal volatile matter. For example, at coal volatile matter around 32–36% by weight, the pulverized coals exhibited no apparent ignition time delays even when burned in air, whereas slurries A, C, and D exhibited sizeable delays. Therefore, the ignition time delays could not be predicted for the coal/water slurries from the pulverized parent coal data since there were no measured delays. Moreover, the unexpected role of oxygen enrichment could also not be predicted from the prior art for the same reason.

EXAMPLE 3

In the same horizontal combustor described in Examples 1 and 2, the same coals and coal/water slurries were combusted to evaluate carbon conversion efficiency. In these tests, the primary air was again controlled at 15% of the total combustion air with 20% excess total air fed to the combustor. In all these tests, the oxygen enrichment of the total combustion air was increased up to approximately 1 vol%. That is, experiments where oxygen was added to the primary air yielded oxygen contents up to 27.7 vol% and experiments where oxygen was added to the secondary air yielded oxygen contents up to 22.1 vol%.

Unlike the experiments described in Examples 1 and 2 in which the furnace was fired with cold walls (room temperature), these experiments were conducted with the furnace preheated to approximately 900° C. The pilot jet was kept on during the entirety of each experiment which lasted approximately one hour. Therefore, ignition times delays were much smaller and flames more stable than those in Example 2 primarily due to the increased temperatures. In this manner, combustion with oxygen enrichment of the secondary airstream was possible so that carbon conversion efficiency could be studied.

Table IV contains the experimentally measured carbon conversion efficiencies for the coal/water slurries listed in Table II. Data for a neat coal are also presented for comparison purposes.

Carbon conversion efficiency was measured in two ways: (1) by monitoring the concentration of gaseous $CO_2$, CO and $O_2$ in the exhaust and (b) by capturing particulate matter (ash) in the exhaust and determining the carbon in the residue. At complete burnout, there is no carbon in the ash and the $CO_2$ concentration reaches its maximum possible value based on the fuels ultimate analysis.

As the data in Table IV show, a 1 vol% overall enrichment of the total combustion air (primary $O_2$ from 21 vol% to 27.7 vol% or secondary $O_2$ up to 22.1 vol%, respectively) dramatically increased the carbon conversion efficiency of pulverized coal and coal/water slurry flames. Specifically, a 1 vol% overall oxygen enrichment when oxygen was introduced in the primary air caused a greater increase in the carbon conversion efficiency than did a equivalent enrichment of secondary air. Moreover, a primary air oxygen-enrichment level of 25 vol% oxygen (or a total combustion air enrichment of only 0.60 vol%) was sufficient to produce the maximum possible carbon conversion efficiency for three of the slurries tested. Despite the results for the neat coal, it was unexpected to find that the increases in carbon conversion for the slurries would be even greater than for neat coal, at lower $O_2$ enrichment rates even with the associated water in the slurries.

TABLE IV

COAL AND COAL/WATER SLURRY FLAME CARBON CONVERSION EFFICIENCIES WITH AND WITHOUT OXYGEN-ENRICHMENT AND VERSUS OXYGEN-ENRICHED AIR PLACEMENT

| | Carbon Conversion Efficiency, (%) | | | | | | |
|---|---|---|---|---|---|---|---|
| | Primary Air (15%) Enrichment $O_2$ Partial Pressure | | | | | Secondary Air (85%) Enrichment ($O_2$ Partial Pressure) | |
| Coal Fuel | 21% | 22% | 23% | 25% | 27.7% | 21% | 22.1% |
| Pulverized Coal* | 95 | 96 | 98 | 99 | 99+ | 95 | 96 |
| Slurry A | 98 | 99 | 99+ | 99+ | 99+ | 98 | 98 |
| Slurry B | — | — | 86 | 94 | ~94 | — | — |
| Slurry C | 96 | 98 | 99+ | 99+ | 99+ | 96 | 97 |
| Slurry D | 97 | 99+ | 99+ | 99+ | 99+ | 97 | 98 |

| Fuel Property | Pulverized Coal* |
|---|---|
| Volatile Matter (wt %, parent) | 29.9 |
| Ash (wt %, parent) | 18.1 |
| Fixed Carbon (wt %, parent) | 51.2 |
| Moisture (wt %) | 0.8 |
| Heating Value (Btu/lb) | 12,032 |

The results in Table IV demonstrate the importance of oxygen enriched air placement and the utility of rather low-levels of oxygen-enrichment. This phenomenon is the result of enhanced devolatization of the raw coal particles as they enter the combustor through immediate contact in the primary airstream. Since devolatization occurs predominately in the primary airstream during and shortly thereafter ignition, the benefits of enriched air are maximized when it is added to the primary airstream. At constant firing rates: (a) introducing the oxygen-enriched air at the wrong position reduces the effectiveness of this improved combustion coal process and (b) enriching the primary air oxygen partial pressure to greater than 25 vol% does not result in any further apparent increase in carbon conversion efficiency, respectively. Regarding the last, the use of higher oxygen-enrichment levels of the primary air would be warranted if higher firing rates were called for while maintaining the high carbon conversion efficiencies. This effect is illustrated by the data in Table IV for coal/water slurries A, C, and D burning with the primary air having an oxygen partial pressure of 25 vol%. In these tests, the carbon conversion efficiencies were all 99+ when the slurries were fired at 0.1 gallon per hour. At this enrichment level, it was determined that the coal/water slurry flow rate could be increased from 0.1 gallon per hour to 0.75 gallon per hour while maintaining a 99% carbon conversion efficiency.

In summary, it has been found that the addition of relatively low levels of oxygen to the primary combustion air unexpectedly improves carbon conversion efficiency and represents a new process for the efficient utilization of coal-bearing fuels. Oxygen addition to secondary air was also shown to be beneficial, as would be expected of oxygen addition to the combustion zone through other means, such as lances or separately-oriented ducts; however, the unexpected magnitude of improvements found through enrichment of the primary air were neither predictable nor extrapolatable.

Overall, the preceding two examples provide evidence that oxygen addition to the primary or secondary airstreams improves the ignition times and carbon conversion efficiencies for four coal/water slurries. On the basis of this data, it is preferable to add the oxygen enrichment to the primary airstream to maximize the benefits. Since the mechanisms for ignition time or carbon conversion efficiency are the same for any carbon-containing particulate fuel within a slurry phase, it can be concluded that the benefits described herein for coal can be realized for other solids combusted in the same manner. Using the same rationale, it can be concluded that the optimum oxygen enrichment for any particular coal/water slurry depends on specific slurry characteristics. For the four slurries tested, the maximum overall concentration of oxygen in the combustion zone was approximately 23.0 percent by volume. At this level, the ignition and carbon conversion efficiencies were dramatically improved. However, it is reasonable to expect that higher oxygen enrichment may be required for larger burner nozzles, uniquely different nozzle designs, and for coals whose volatile matter and properties are different than those used in the examples. It is contemplated that oxygen contents in the total combustion air ranging up to approximately 28.0 percent by volume may be employed to achieve the benefits described herein.

The present invention has been set forth by a description of a preferred embodiment. Those skilled in the art will recognize modifications of the invention that are deemed to be within the scope of the invention which scope should be ascertained from the claims which follow.

I claim:

1. A method for combusting coal/water slurries with oxygen enriched air in a furnace firebox which contains means for supplying a coal/water slurry, a primary airstream and a secondary airstream into the firebox, for the purpose of substantially complete combustion of the coal to $CO_2$ and $H_2O$;
    (a) feeding a coal/water slurry into the furnace firebox along with the primary and secondary airstreams to yield a flame of combustion, and
    (b) adding a sufficient amount of oxygen into the primary airstream, such that oxygen concentration of the air in the flame zone when the primary and secondary airstreams converge with the coal is greater than 21 up to 28 volume percent.

2. The method of claim 1 wherein the primary air represents approximately 15% of the total air fed to the combustion.

3. The method of claim 1 wherein the combustion is run with 20% overall excess air to the firebox.

4. The method of claim 1 wherein the coal/water slurry has a volatile content of at least 20 wt%.

5. The method of claim 1 wherein the total airstream is enriched with oxygen to 22% by volume.

6. The method of claim 1 wherein the furnace firebox is a utility boiler for generating steam in the production of electricity.

7. The method of claim 1 wherein the oxygen concentration of the primary airstream is above 21% and up to 27.7%.

8. The method of claim 1 wherein the furnace firebox is an industrial type boiler for generating steam for process uses.

9. A method for combusting coal/water slurries with oxygen enriched air in a furnace firebox which contains means for supplying a coal/water slurry, a primary airstream and a secondary airstream into the firebox, for the purpose of substantially complete combustion of the coal to $CO_2$ and $H_2O$;
- (a) feeding a coal/water slurry into the furnace firebox along with the primary and secondary airstreams to yield a flame of combustion, and
- (b) adding oxygen into the primary airstream to result in an oxygen concentration of the primary airstream above 21 and up to 27.7 volume percent, such that oxygen concentration of the air in the flame zone when the primary and secondary airstreams converge with the coal is greater than 21 up to 22 volume percent.

* * * * *